United States Patent [19]

Iwaki et al.

[11] Patent Number: 4,676,331

[45] Date of Patent: Jun. 30, 1987

[54] TORQUE DETECTING APPARATUS FOR ELECTRICAL POWER STEERING SYSTEM

[75] Inventors: Takashi Iwaki; Takashi Hayashi, both of Ohbu, Japan

[73] Assignee: Kabushiki Kaisha Toyoda Jidoshokki Seisakusho, Kariya, Japan

[21] Appl. No.: 805,820

[22] Filed: Dec. 6, 1985

[30] Foreign Application Priority Data

Dec. 20, 1984 [JP] Japan .............................. 59-194802[U]
Apr. 24, 1985 [JP] Japan .............................. 60-62137[U]

[51] Int. Cl.$^4$ ............................................. B62D 5/04
[52] U.S. Cl. ................................. 180/79.1; 73/862.33
[58] Field of Search .................... 180/79.1, 132, 133; 73/862.32, 862.33

[56] References Cited

U.S. PATENT DOCUMENTS

| | | | |
|---|---|---|---|
| 2,587,377 | 2/1952 | Penrose | 180/79.1 |
| 4,003,446 | 1/1977 | Fleury | 180/132 |
| 4,582,155 | 4/1986 | Ohe | 180/79.1 |

FOREIGN PATENT DOCUMENTS 755484 8/1956 United Kingdom ............... 180/79.1

*Primary Examiner*—John A. Pekar
*Attorney, Agent, or Firm*—Brooks Haidt Haffner & Delahunty

[57] ABSTRACT

A torque detecting apparatus for an electrical power steering system, having a steering wheel, a first steering shaft connected to the steering wheel, a second steering shaft connected to a vehicle wheel to be steered, an electric motor connected to the second steering shaft, and a controller for operating the motor to produce a driving force corresponding to a torque detected by the torque detecting apparatus. The apparatus comprises: an elastic coupling having an elastic member, and coupling the steering shafts while permitting relative rotation of the steering shafts through elastic deformation of the elastic member; a first and a second detector shaft supported rotatably relative to each other; a first and a second speed-up device for increasing angular velocities of rotary movements of the first and the second steering shafts and transmitting the rotary movements to the first and second detector shafts, respectively; and a detector associated with the detector shafts to detect an angle of relative rotation of the detector shafts and thereby detect the steering torque, and producing an electric signal representative of the torque, said signal being applied to the controller.

15 Claims, 11 Drawing Figures

TORQUE DETECTING APPARATUS FOR ELECTRICAL POWER STEERING SYSTEM

BACKGROUND OF THE INVENTION

1. Field of the Art

The present invention relates to a torque detecting apparatus in an electrically operated power steering system.

2. Related Art Statement

In a commonly known electrically operated power steering system, a first steering shaft connected to a steering wheel is coupled, by an elastic coupling device, to a second steering shaft which is connected through a linkage to a vehicle's wheel to be steered, so that the first and second steering shafts are rotatable relative to each other. The second steering shaft is driven by suitable electric drive means such as a servo motor, in response to an electric signal produced by a rotation detector which senses a relative angular displacement of the first and second steering shafts that corresponds to a steering torque applied to the steering wheel upon rotation of the steering wheel.

For detecting an angular displacement of the first steering shaft relative to the second steering shaft, it is generally practiced to convert that relative angular displacement into a linear movement by utilizing an externally threaded screw and a nut engaging the screw, and by sensing the linear movement by a potentiometer. An example of such detector is disclosed in Japanese Patent Application which was laid open in 1983 under Publication No. 58-53562. In the disclosed detector arrangement, an externally threaded shaft is secured to the first steering shaft, so that the threaded shaft engages an internal thread formed in a coupling box fixed to the second steering shaft. The first steering shaft and the threaded shaft are supported so that they are movable in the axial directions when the first steering shaft is rotated relative to the second steering shaft. Upward and downward axial movements of the threaded shaft are limited by an upper and a lower stop member provided within the gearbox. The upper and lower stop members are adapted to abut on an abutment member secured to the end of the threaded shaft. The threaded shaft is normally held in its neutral position by a pair of return springs which act on the threaded shaft in opposite axial directions. In this arrangement, a rotary movement of the first steering shaft is converted into its axial movement by means of the externally threaded shaft engaging the internally threaded coupling box fixed to the second steering shaft. The axial displacement of the first steering shaft is detected by a suitable sensor.

PROBLEM SOLVED BY THE INVENTION

In such a conventional torque detecting arrangement wherein a rotary motion is converted into a linear motion by means of engagement of external and internal threads, the linear movement to be obtained is relatively small. To sense such a relatively small amount of linear movement, an expensive sensor capable of highly precise detection must be used, and such sensor must be installed with high accuracy. Further, the sensor may operate erroneously due to a relative axial displacement of the first and second steering shafts upon vibrations of the power steering system during service of the vehicle. Furthermore, the use of the external and internal threads for conversion of a rotary movement into a linear movement is disadvantageous when the elastic coupling connecting the first and second steering shafts is restored to its original or neutral position by elastic expanding forces of the compression return springs upon release of an operating force from the steering wheel. That is, the conversion of a linear movement of the threaded shaft into its rotary movement may not be done smoothly and exactly by the return springs which act on the threaded shaft in its axial directions.

SUMMARY OF THE INVENTION

It is accordingly an object of the present invention to provide a torque detecting apparatus wherein a relative angular velocity of a first and a second steering shaft is amplified before it is detected.

According to the present invention, there is provided a torque detecting apparatus for an electrical power steering system, having a steering wheel, a first steering shaft connected to the steering wheel, a second steering shaft connected to a vehicle wheel to be steered, an electrically operated motor connected to the second steering shaft, and a controller for operating the motor to produce a driving force corresponding to a steering torque detected by the torque detecting apparatus, the torque detecting apparatus comprising: an elastic coupling having an elastic member, and coupling the first and second steering shafts while permitting relative rotation of the first and second steering shafts through elastic deformation of the elastic member; a first detector shaft and a second detector shaft which are supported rotatably relative to each other; a first speed-up device for increasing an angular velocity of a rotary movement of the first steering shaft and transmitting the rotary movement to the first detector shaft; a second speed-up device for increasing an angular velocity of a rotary movement of the second steering shaft and transmitting the rotary movement to the second detector shaft; and a rotation detector associated with the first and second detector shafts to detect an angle of relative rotation of the first and second detector shafts and thereby detect the steering torque, the detector producing an electric signal representative of the steering torque, the electric signal being applied to the controller.

In the torque detecting apparatus of the invention constructed as described above, the elastic coupling is twisted according to a steering torque applied to the steering wheel upon rotation thereof, permitting a relative angular displacement between the first and second steering shafts. The relative angular displacement of the first and second steering shafts is speeded up by the first and second speed-up devices, and transmitted to the first and second detector shafts, whereby an amplified angular displacement corresponding to the steering torque is obtained between the first and second detector shafts. This amplified angular displacement is detected by the rotation detector to detect an angle of relative rotation of the first and second steering shafts and thereby detect the steering torque of the steering wheel. An electric signal generated from the rotation detector is applied to the controller to activate the electric motor to produce a driving force corresponding to the detected steering torque of the steering wheel. Thus, the second steering shaft is driven by the electric motor according to the detected steering torque. Since the amplified angular displacement of the first and second detector shafts is detected, the steering torque currently applied to the steering wheel is detected with an increased accuracy and with a minimum detecting error due to vibrations, without using a costly high-precision detector as required in a conventional arrangement as previously discussed.

According to an advantageous embodiment of the invention, the first speed-up device comprises a first gear fixed to the first steering shaft, and a first pinion fixed to the first detector shaft and engaging the first gear, while the second speed-up device comprises a second gear fixed to the second steering shaft, and a second pinion fixed to the second detector shaft and engaging the second gear.

According to another advantageous embodiment of the invention, the first and second detector shafts are disposed coaxially with each other, and the rotation detector comprises an axially movable member, a mechanical converter and an axial detector. The axially movable member is axially movable in axial directions of the first and second detector shafts, and the mechanical converter converts the relative rotation of the first and second detector shafts into an axial movement of the axially movable member. The axial detector detects the axial movement of the axially movable member. In this case, the steering torque is easily detected by a simple detector such as a potentiometer, a sensor of capacitive type or a sensor using a magnet and hole elements.

In one preferred form of the above embodiment, one of the first and second detector shafts is axially movable and functions as the axially movable member. In another preferred form, the axially movable member is axially movable but not rotatable relative to one of the first and second detector shafts.

In a further preferred form of the above embodiment, the mechanical converter comprises a cam and a cam follower, the cam has a spiral cam groove formed about an axis aligned with axes of the first and second detector shafts. The cam follower is rotatable and axially movable relative to the cam and has a protrusion such as a roller fitting in the spiral cam groove of the cam. Even in this case, the twisted elastic coupling can be readily restored to its neutral or original position, in such manner that the cam is easily rotated relative to the cam follower in the corresponding direction by an elastic force of the elastic coupling due to its elastic twisting upon rotation of the steering wheel.

In a still further preferred form of the above embodiment, the mechanical converter comprises an externally threaded member and an internally threaded member which are coaxial with the first and second detector shafts and which engage with each other. In this case, too, the twisted elastic coupling may be readily returned to its neutral position, because the elastic restoring force of the elastic coupling easily rotates the axially movable member.

In accordance with a further embodiment of the invention, the first steering shaft includes a first supporting portion having at least one pair of first bearing surfaces which are located away from an axis of the first steering shaft in the radial direction, while the second steering shaft includes a second supporting portion having at least one pair of second bearing surfaces which are located away from an axis of the second steering shaft in the radial direction. The first bearing surfaces face each other in spaced-apart relation in the circumferential direction of the first steering shaft. Similarly, the second bearing surfaces face each other in spaced-apart relation in the circumferential direction of the second steering shaft. The first and second supporting portions are movable relative to each other in the opposite circumferential directions of the steering shafts, from a reference or neutral circumferential or angular position at which the first and second supporting portions are aligned with each other, when the first and second steering shafts are rotated relative to each other. Further, the elastic coupling comprises a coil spring disposed circumferentially of the first and second steering shafts, between each of the above-indicated at least one pair of first bearing surfaces, and between each of the above-indicated at least one pair of second bearing surfaces. The coil spring is compressed when the first and second supporting portions are rotated relative to each other in one of the opposite circumferential directions.

In the above embodiment, the first and second supporting portions of the first and second steering shafts are placed in the reference or neutral angular position when a steering torque is not imparted to the steering wheel. This reference position is easily established by the coil spring disposed between each pair of first and second mutually-facing bearing surfaces. This arrangement eliminates adjustments of the angular positions of the first and second steering shafts to establish their neutral circumferential position, as required in a conventional arrangement when its first and second steering shafts and elastic member are assembled. Further, the instant arrangement permits the coil spring or springs to be compressed along its or their axes, in substantially the same manner in both directions of rotation of the steering wheel. Therefore, the elastic coupling is capable of exhibiting a comparatively linear and substantially the same stress-strain curve, in both directions of rotation of the steering wheel. Thus, the steering torque of the steering wheel is detected with improved accuracy.

In one preferred form of the above embodiment, one of the first and second supporting portions consists of a first ring-shaped member disposed coaxially with the steering shafts, and the other of the first and second supporting portions consists of a second ring-shaped member having an annular groove in which the first ring-shaped member fits such that the first and second ring-shaped members are rotatable relative to each other. The first and second ring-shaped members have at least one radial groove which extends in their radial direction. This at least one radial groove defines the above-indicated at least one pair of first bearing surfaces, and at least one pair of second bearing surfaces. The first bearing surfaces have substantially the same circumferential spacing as the second bearing surfaces.

In another preferred form of the above embodiment, the coil spring is pre-loaded or pre-compressed even when the first and second supporting portions are located at the reference circumferential position. However, it is preferred that the coil spring is disposed without a pre-loading pressure and without a clearance to the first and second bearing surfaces.

In a further preferred form of the above embodiment, the opposite ends of the coil spring bear on the first and second bearing surfaces via retainer means.

In accordance with yet another advantageous embodiment of the invention, the first and second steering shafts are disposed coaxially with each other, and the elastic coupling comprises circumferential stop means for limiting a maximum angle of relative rotation of the first and second steering shafts.

In an advantageous form of the above embodiment, one of the first and second steering shafts has a tubular portion coaxial with the steering shafts, and the other of the steering shafts has a shaft portion which fits in the tubular portion. The tubular portion and the shaft portion are connected to each other by a pin which is inserted through a first and a second through-hole formed through corresponding parts of the tubular and shaft portions, respectively, in their diametric direction. One of the first and second through-holes has a diameter larger than that of the pin. In this case, the stop means is constituted by the tubular portion, the shaft portion and the pin.

BRIEF DESCRIPTION OF THE DRAWINGS

The above and optional objects, features and advantages of the present invention will become more apparent from reading the following detailed description of preferred embodiments of the invention, when considered in connection with the accompanying drawings, in which.

DETAILED DESCRIPTION OF THE PREFERRED EMBODIMENTS

Figure 1:
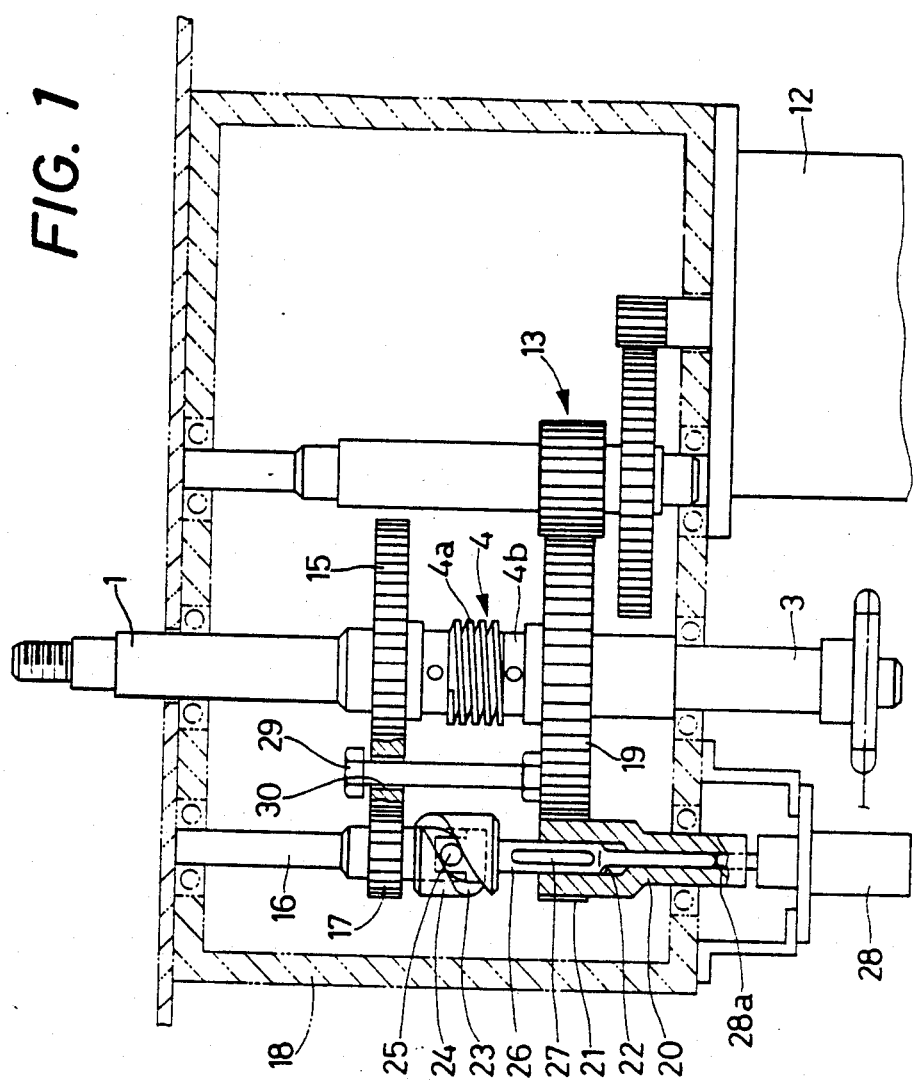
FIG. 1 is an elevational view in cross section of one embodiment of a torque detecting apparatus of the present invention.
Figure 2:
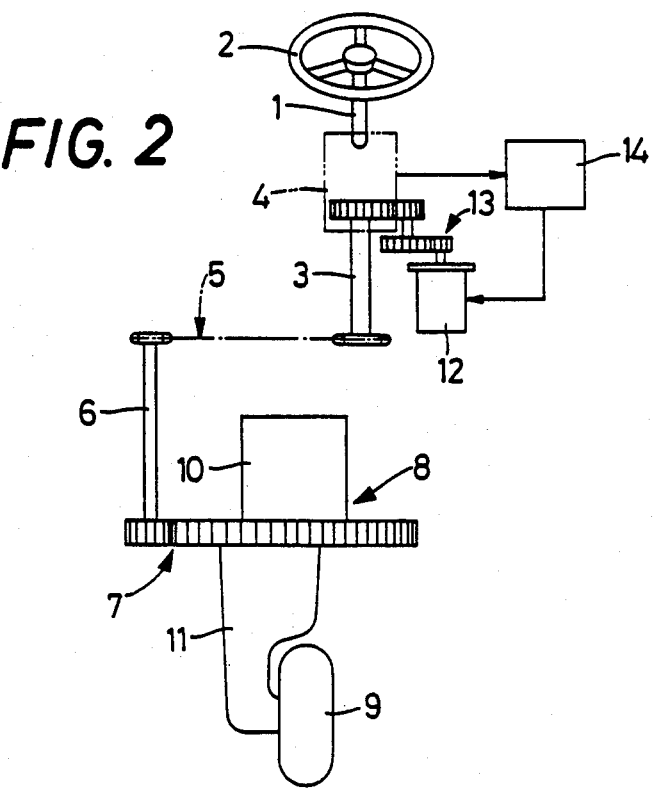
FIG. 2 is an illustration of an electrical power steering system incorporating the torque detecting apparatus of FIG. 1, used in a battery-powered forklift truck of a reach type.

Referring first to FIGS. 1 and 2, there is shown an electrically operated power steering system in a battery-powered forklift truck of a reach type. In the figure, reference numeral 1 designates a first steering shaft connected at its one end to a steering wheel 2, while reference numeral 3 designates a second steering shaft which is connected at its one end to the first steering shaft 1 through an elastic coupling 4. The second steering shaft 3 is connected at the other end to a drive unit 8 via a chain transmission mechanism 5, a transmission shaft 6 and a gear train 7. A driving wheel 9 to be steered by the steering wheel 2 is rotated by an electric drive motor 10 through a gear train (not shown) housed in a gearbox 11 of the drive unit 8. The second steering shaft 3 is driven by a steering electric servo motor 12 through a reduction gear unit 13, under the control of a controller 14.

The elastic coupling 4, which is referred to as "helical coupling", is adapted to permit an angular displacement of the first and second steering shafts 1 and 3 relative to each other. Described more particularly referring to FIG. 1, the elastic coupling 4 consists of a tubular member, having an elastic portion 4a and hub portions 4b integral with the elastic portion 4a. The elastic portion 4a is formed by cutting a helical groove in an axially intermediate portion of the tubular member. Upon rotation of the steering wheel 2, the thus formed elastic portion 4a is capable of being elastically twisted, allowing the first and second steering shafts to be rotated relative to each other.

The elastic coupling 4 of the power steering system arranged as indicated above forms a part of a torque detecting apparatus which will be described in detail. As illustrated in FIG. 1, a large-diameter gear 15 is formed on (or fixed to) the lower end (in FIG. 1) of the first steering shaft 1. This gear 15 meshes with a pinion 17 which is formed on (or fixed to) a first detector shaft 16 disposed parallel to the first steering shaft 1. The first detector shaft 16 is rotatably supported by a gearbox 18. Similarly, a large-diameter gear 19 is formed on (or fixed to) the upper end of the second steering shaft 3. This gear 19 meshes with a pinion 21 formed on (or fixed to) a second detector shaft 20 which is rotatably supported by the gearbox 18 in parallel with the second steering shaft 3. Thus, the gear 15 and the pinion 17 constitute a first speed-up device for increasing an angular velocity of a rotary movement of the first steering shaft 1, while the gear 19 and the pinion 21 constitute a second speed-up device for increasing an angular velocity of a rotary movement of the second steering shaft 3. The second detector shaft 20 is formed with a stepped axial hole 22 aligned with the axis of the shaft 20. The stepped axial hole 22 has an upper and a lower section, the upper section having a diameter larger than the lower section. The large-diameter gear 19 on the second steering shaft 3 serves also as a driven gear for the reduction gear unit 13. However, another gear may be provided on the second steering shaft 3, to serve as the driven gear for the reduction gear unit 13.

In the meantime, the first and second detector shafts 16, 20, which are disposed in coaxial relation, are provided with a mechanical converter for converting a relative rotary movement thereof into a linear or axial movement. Stated in detail, the mechanical converter consists of a cylindrical cam device which comprises a cylindrical cam 24 loosely fitting on the lower end portion of the first detector shaft 16, and a cam follower in the form of a roller 25 formed on the shaft 16. The cylindrical cam 24 has a spiral cam groove 23 formed about an axis aligned with the axis of the detector shaft 16. The roller 25 is formed on the first detector shaft 16, so that the roller 25 engages the spiral cam groove 23. The cylindrical cam 24 is formed with a lower stepped-diameter shaft portion 26 which has an upper section having a large diameter, and a lower section having a small diameter. This shaft portion 26 is axially slidably fitted in the stepped axial hole 22 formed in the second detector shaft 20, so that the shaft portion 26 is rotatable together with the second detector shaft 20 through a key 27. An axial displacement or movement of the shaft portion 26 is sensed by a rotation detector in the form of a potentiometer 28 secured to the gearbox 18. More specifically, potentiometer 28 has an axially movable sensing element 28a which extends into the axial hole 22 in the second detector shaft 20, such that the upper end of the sensing element 28a is held in contact with the lower end of the shaft portion 26 of the cylindrical cam 24.

A stop bolt 29 is secured to the large-diameter gear 19 on the second steering shaft 3, and extends through an elongated hole 30 formed through the large-diameter gear 15 on the first steering shaft 1. This stop bolt 29 and the elongated hole 30 cooperate to limit the angle of twist of the elastic coupling 4 to a maximum of 5°. In other words, the stop bolt 29 and the elongated hole 30 constitute stop means for limiting a maximum angle of relative rotation of the first and second steering shafts 1, 3.

There will be described the operation of the torque detecting apparatus which has been constructed as described hitherto.

Upon rotation of the steering wheel 2 in the clockwise or counterclockwise direction, the elastic portion 4a of the elastic coupling 4 is twisted and the first steering shaft 1 is rotated relative to the second steering shaft 3 by an angle (a maximum of 5°) corresponding to a steering torque exerted on the steering wheel 2. With this relative rotary movement of the first and second steering shafts 1, 3, the first detector shaft 16 is rotated through the large-diameter gear 15 and the pinion 17, whereby the cylindrical cam 24 is moved downward or upward through engagement of the roller 25 with the spiral cam groove 23. As a result, the shaft portion 26 is moved downward or upward in the axial hole 22 in the second detector shaft 20. Supposing that the gear ratio of the large diameter gear 15 to the pinion 17 is equal to that of the large-diameter gear 19 to the pinion 21, the amount of relative angular displacement of the first and second detector shafts 16, 20 is a multiple of that of the first and second steering shafts 1, 3, which multiple is equal to the above gear ratio.

Thus, an amplified axial displacement of the shaft portion 26 of the cylindrical cam 24 is obtained, and the amount and direction of the axial displacement are detected by the potentiometer 28 fixed to the gearbox 18. The potentiometer 28 produces an electric signal representative of the axial displacement amount and its direction. This electric signal is applied to the controller 14. In response to the electric signal from the potentiometer 28, the controller 14 controls the operation of the servo motor 12 so that the motor 12, produces a driving force corresponding to the axial displacement of the shaft portion 26, i.e., corresponding to the relative rotary movement of the first and second steering shafts 1, 3 which represents a steering torque of the steering wheel 2. As a result, the second steering shaft 3 is driven by the servo motor 12 through the reduction gear unit 13, whereby the drive unit 8 is rotated about its axis through the chain transmission mechanism 5, the transmission shaft 6 and the gear train 7. In this manner, the drive wheel 9 is steered in the direction corresponding to the direction of rotation of the steering wheel 2.

When a force which has been exerted on the steering wheel 2 is removed, the twist of the elastic coupling 4 at its elastic portion 4a is eliminated, that is, the elastic coupling 4 is restored to its normal or original non-twisted position. Consequently, the cylindrical cam 24 is rotated by a rotational force transmitted from the gear 15 and the pinion 17, to its original or neutral position.

Figure 3:
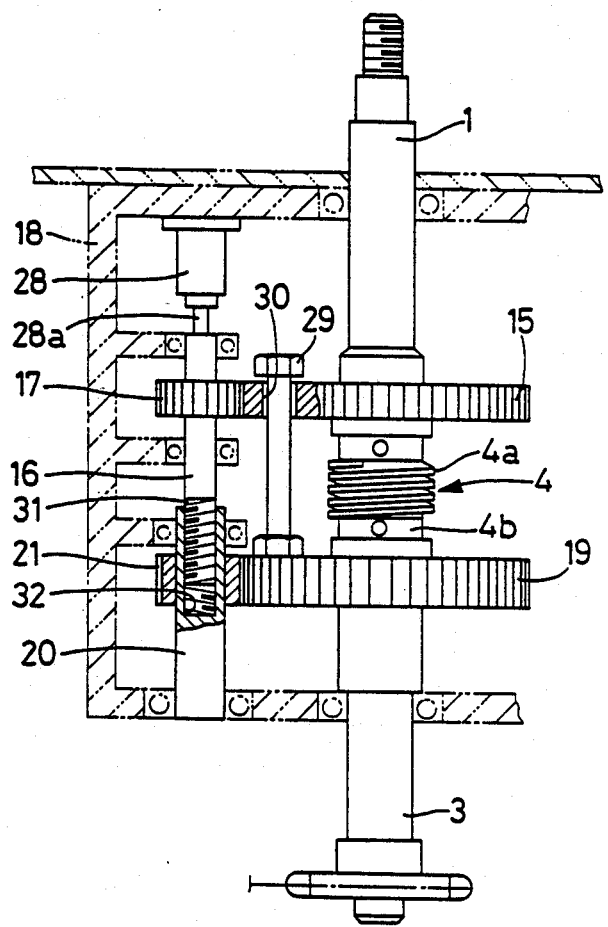
FIG. 3 is an elevational cross sectional view of another embodiment of the torque detecting apparatus of the invention.

Referring to FIG. 3, another embodiment of the present invention will be described. The same reference numerals as used in FIG. 1 are used in FIG. 3 to identify the corresponding components.

This embodiment is different from the preceding embodiment in the construction of the mechanical converter for converting a relative rotary movement of the detector shafts 16, 20 into an axial movement of the cylindrical cam 24. Described more specifically, one of the detector shafts 16, 20, that is, the first detector shaft 16 is formed with an externally threaded portion 31, while the other detector shaft 20 is formed with an internally threaded portion 32 which engages the externally threaded portion 31. In the meantime, the first detector shaft 16 is supported by the gearbox 18 such that the shaft 16 is rotatable about its axis and axially slidable relative to the second detector shaft 20. The potentiometer 28 is disposed so as to detect the axial displacement of the first detector shaft 16, for detecting the relative rotary movement of the first and second detector shafts. In other aspects, the present modified embodiment of FIG. 3 is identical to the preceding embodiment of FIG. 1.

In the embodiment of FIG. 3, an angular displacement of the first and second steering shafts 1 and 3 upon rotation of the steering wheel 2, is amplified as a relative angular displacement between the first and second detector shafts 16, 20, with the relative angular velocity increased corresponding to the gear ratio of the gear 15 to pinion 17. Therefore, the upward or downward axial displacement of the first detector shaft 16 is accordingly amplified. The subsequent operation of the power steering system is effected in the same manner as previously described. In the case where the first and second detector shafts 16, 20 are formed with multiple external and internal threads, the axial displacement of the first detector shaft 16 may be further increased.

Figure 4:
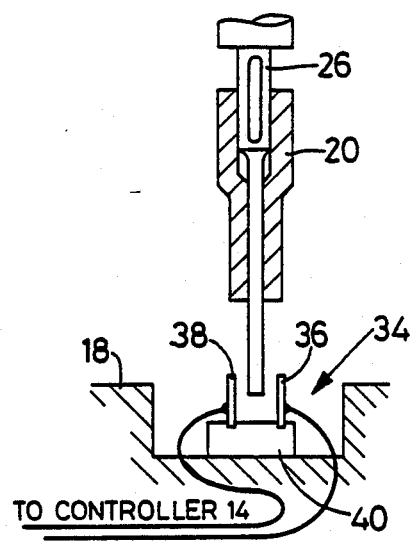
FIGS. 4 and 5 are illustrations showing modified forms of a rotation detector usable in the embodiments of FIGS. 1 and 3.
Figure 5:
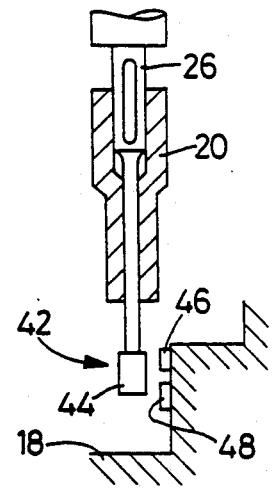

While the illustrated embodiments of FIGS. 1 and 3 use a rotation detector in the form of the potentiometer 28, other types of detectors may be used. For example, the potentiometer 28 of FIG. 1 may be replaced by a sensor 34 of a capacitive type as shown in FIG. 4, or a sensor 42 as shown in FIG. 5. The sensor comprises electrodes 36, 38 which are fixedly disposed on a block of resin 40 secured to the gearbox 18, such that the end of the shaft portion 26 of the cylindrical cam 24 is axially movable between the two electrodes 36, 38. As the shaft portion 26 is axially moved, the electrostatic capacity of the sensor 34 is varied, and the corresponding signal is applied to the controller 14. The sensor 42 comprises a magnet 44 fixed to the end of the shaft portion 26, and two hole elements 46, 48 which are disposed on the gearbox 18 in spaced-apart relation along the axis of the shaft portion 26, so that the hole elements 46 may detect the position of the magnet 42 in the axial direction of the shaft portion 26.

The elastic coupling 4 used in the embodiments of FIGS. 1 and 3 may be replaced by other suitable elastic means such as springs or rubber members.

A further embodiment of the torque detecting apparatus of the invention is shown in FIGS. 6–9. This embodiment is different from the previous embodiments of FIGS. 1 and 3, particularly in the construction of an elastic coupling which elastically couples the first and second steering shafts 1, 3.

Figure 6:
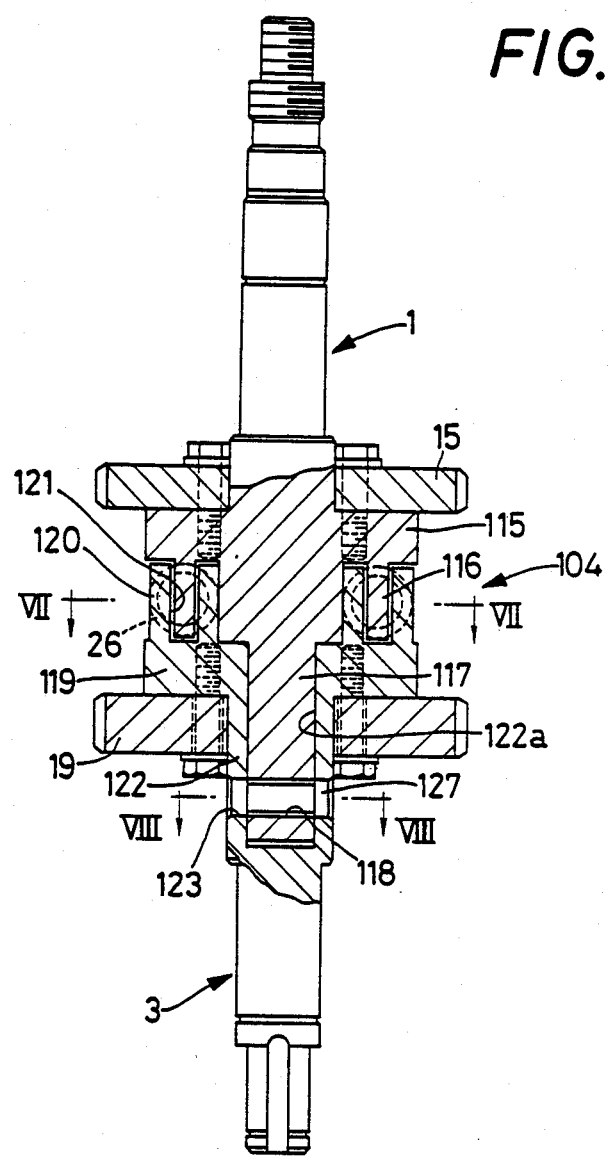
FIG. 6 is a partly cutaway elevational view of a part of a torque detecting apparatus according to a further embodiment of the invention.
Figure 7:
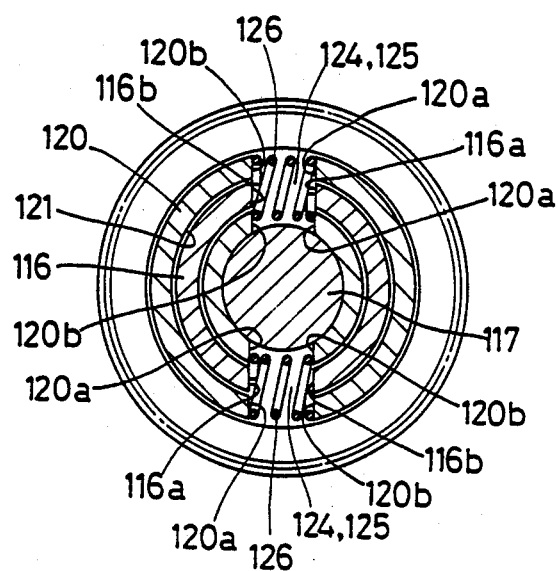
FIG. 7 is a cross sectional view taken along line VII—VII of FIG. 6.

In this embodiment, the first and second steering shafts 1 and 3 are elastically connected to each other by an elastic coupling generally indicated at 104 in FIGS. 6 and 7. Described in greater detail, the first steering shaft 1 is formed with an integral flange 115 having a suitable diameter. The flange 115 has a first ring-shaped portion 116 which extends downwardly from the lower surface (in FIG. 6) of the flange 115, concentrically with the flange 115. The first ring-shaped portion 116 has a diameter smaller than that of the flange 115. Further, the first steering shaft 1 is formed with a stepped-diameter shaft portion 117 which extends from the flange 115 such that its upper large-diameter section is disposed within the first ring-shaped portion 116. The large-diameter section terminates in a lower small-diameter section which has a through-hole 118 formed therethrough in its diametric direction, as most clearly illustrated in FIG. 8. The through-hole 118 has a diamter d1.

Figure 8:
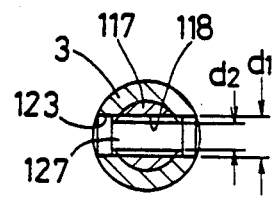
FIG. 8 is a cross sectional view taken along line VIII—VIII of FIG. 6.

In the meantime, the second steering shaft 3 is formed with an integral flange 119 which has a second ring-shaped portion 120 slidably engaging the first ring-shaped portion 116 of the first steering shaft 1. More particularly, the second ring-shaped portion 120 extends upward from the upper surface (in FIG. 6) of the flange 119 so as to define an annular groove 121 in which the first ring-shaped portion 116 is slidably received such that the two ring-shaped portions 116, 120 are rotatable relative to each other. The second steering shaft 3 is formed at its upper portion with a tubular portion 122 coaxial with the shaft portion 117 of the first steering shaft 1. The tubular portion 122 has an axial bore 122a in which the lower small-diamter section of the shaft portion 117 is received rotatably relative to the tubular portion 122. The tubular portion 122 has a pair of diametrically opposed through-holes 123 which are aligned with the through-hole 118 in the shaft portion 117 of th1 first steering shaft 1 as shown in FIG. 8. Each of the first and second ring-shaped portions 116 and 120 has a pair of diameterically opposed radial grooves 124, 125 of the same width, respectively, which are aligned in the radial direction of the ring-shaped portions 116, 120. The radial grooves 124 define two pairs of first bearing surfaces 116a, 116b which face each other in spaced-apart relation in the circumferential direction of the first ring-shaped portion 116. Similarly, the radial grooves 125 define two pairs of second bearing surfaces 120a, 120b facing each other in spaced-apart relation in the circumferential direction of the second ring-shaped portion 120. Within the aligned radial grooves 124, 125, there are disposed a corresponding pair of helical coil springs 126, 126 such that their axes are horizontal (in FIG. 6), and such that their opposite ends bear on the corresponding bearing surfaces 116a, 116b, 120a, 120b with a very small pre-compression force. In a reference circumferential position (origional angular position) of FIG. 7 (which will be described), the first bearing surfaces 116a, 116b are coplanar with the corresponding second bearing surfaces 120a, 120b.

A stopper pin 127 is inserted through the through-hole 118 formed in the shaft portion 117 of the first steering shaft 1, and through the through-holes 123 formed in the tubular portion 122 of the second steering shaft 3. The stopper pin 127 has opposite end portions having a diameter equal to the diameter d1 of the through-holes 123, and an intermediate portion having a diameter d2 which is smaller than d1 by a predetermined value Δd. The end portions of the stopper pin 127 fit snugly in the through-holes 123. In this arrangement, there exists a smaller clearance between the inner surface of the through-hole 118 and the outer surface of the intermediate portion of the stopper pin 127. Accordingly, the pin 127 and the through-holes 118, 123 permit a relative angular displacement of the first and second steering shafts 1, 3 within a range corresponding to one-half the difference Δd in diameter between d1 and d2. In other words, the pin 127, shaft portion 117 and the tubular portion 122 cooperate to provide stop means for limiting a maximum angle of relative rotation of the first and second steering shafts 1, 3.

In the present embodiment, the large-diameter gear 15 of the first steering shaft 1 is bolted to the upper surface of the flange 115, while the large-diamter gear 19 of the second steering shaft 3 is bolted to the lower surface of the flange 119. As in the previous embodiments, the gear 15 meshes with the pinion 17 on the first detector shaft 16, and the gear 19 meshes with the pinion 21 on the second detector shaft 20 and constitutes a part of the reduction gear unit 13.

The operation of the above embodiment will be described. When the first steering shaft 1 is rotated by the steering wheel 2 for example in the counterclockwise direction (in FIG. 7) within an angular range corresponding to Δd/2, the first ring-shaped portion 116 is rotated in the annular groove 121 in the second ring-shaped portion 120, from the reference angular position of FIG. 7, while their bearing surfaces 116a push the corresponding ends of the helical coil springs 126 disposed in the radial grooves 124, 125. With the bearing surfaces 120b bearing on the corresponding ends of the coil springs 126, the coil springs 126 are compressed by the first ring-shaped portion 116. Thus, the first steering shaft 1 is rotated relative to the second steering shaft 3. This relative angular displacement is detected by the potentiometer 28 as previously described.

As the second ring-shaped portion 120 of the second steering shaft 3 is rotated, the helical coil springs 126 are expanded toward their original positions of FIG. 7. However, if the steering wheel 2 is continuously rotated in the same direction, compression and expansion of the coil springs 126 take place alternately, whereby the servo motor 12 continuously activated to continue an intended steering action of the drive wheel 9. In the case where the steering wheel 2 is rotated in the clockwise direction, the bearing surfaces 116b of the first ring-shaped portion 116 push the corresponding ends of the coil springs 126 in the clockwise direction, and thus compress the coil springs 126 with their other ends supported by the bearing surfaces 120a of the second ring-shaped portions 120. Thus, the first steering shaft 1 is rotated in the clockwise direction relative to the second steering shaft 3, whereby the drive wheel 9 is steered in the corresponding right direction.

In the abovementioned embodiment, the helical coil springs 126 of the elastic coupling 104 are installed substantially horizontally in the radial grooves 124, 125 with a very small pre-loading pressure when the first and second ring-shaped portions 116, 120 are placed in their reference or neutral angular position of FIG. 7 at which no steering torque is imparted to the steering wheel 2. In this condition, the first and second bearing surfaces 116a and 120a are coplanar with each other, while the first and second bearing surfaces 116b and 120b are coplanar with each other, as indicated in FIG. 7. This arrangement eliminates a conventionally required angular adjustment of the first and second steering shafts after they have been connected by elastic coupling means. Further, since the coil springs 126 are easily and smoothly compressed and expanded along their axes, these springs 126 are less likely to have a hysteresis. Consequently, the elastic coupling 104 demonstrates substantially the same characteristics in both clockwise and counterclockwise rotations of the steering wheel 2. Thus, the detected relative angular displacement of the first and second steering shafts 1, 3 will exactly represent a steering torque exerted on the steering wheel 2. In addition, it is noted that the present elastic coupling 104 exhibits a linear stress-strain (torque-compression) curve in both directions of rotation of the steering wheel 2, even if the two coil springs have different spring constants, because a sum of forces of the two springs 126 acts on the steering shafts 1, 3.

Figure 11:
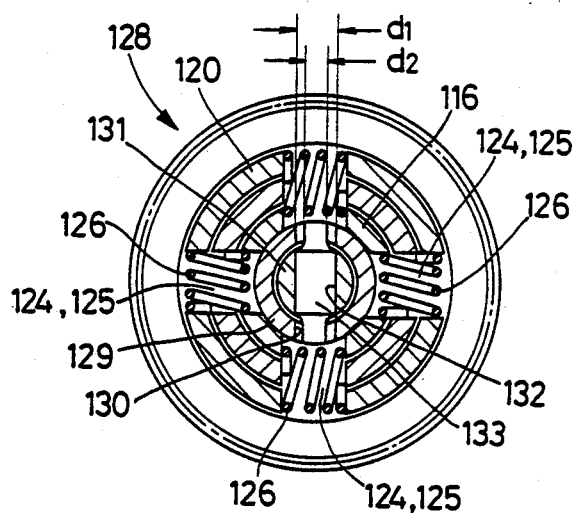
FIGS. 10 and 11 are views corresponding to FIGS. 6 and 7, illustrating a still further embodiment of the invention.
Figure 9:
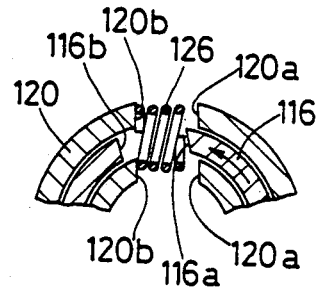
FIG. 9 is a fragmentary view illustrating the operation of ring-shaped members used in the embodiment of FIG. 6.

A still further embodiment of the torque detecting apparatus of the invention will be described, referring to FIGS. 10 and 11.

This embodiment comprises an elastic coupling 128 which includes four helical coil springs 126 as used in the preceding embodiment of FIG. 6. More specifically, the flange 115 of the first steering shaft 1 is formed with a central annular portion 129 in place of the stepped-diameter shaft portion 117 of the preceding embodiment. The central annular portion 129 extends from the lower surface of the flange 115 and has the same height as the first ring-shaped portion 116. The annular portion 129 has a pair of diametrically opposed radial through-holes 130 each having a diameter d1, as shown in FIG. 11. In the meantime, the flange 119 of the second steering shaft 3 is formed with a central protrusion 131 which is rotatably received within the central annular portion 129. The central protrusion 131 has a diametrically formed through-hole 132 which has a diameter d1 and is aligned with the radial through-holes 130 when the first and second steering shafts 1, 3 are placed in their reference circmferential positions of FIG. 11. The radial grooves 124, 125 accommodating the corresponding coil springs 126 are equiangularly spaced from each other (at 90° angular intervals) in the circumferential direction of the first and second ring-shaped portions 116, 120. The first and second steering shafts 1, 3 are connected by a stopper pin 133 which is inserted through the aligned through-holes 130 and 132. This stopper pin 133 has an intermediate portion snugly fitting in the through-hole 132, and opposite end portions which have a diameter d2 smaller than the diameter d1 of the through-holes 130 by a predetermined value Δd. A clearance between the inner surfaces of the through-holes 130 and the outer surfaces of the end portions of the pin 133 permits a relative angular displacement of the first and second steering shafts 1, 3 through the elastic coupling 128, within a range corresponding to one-half the difference Δd between d1 and d2, as explained in connection with the preceding embodiment.

Figure 10:
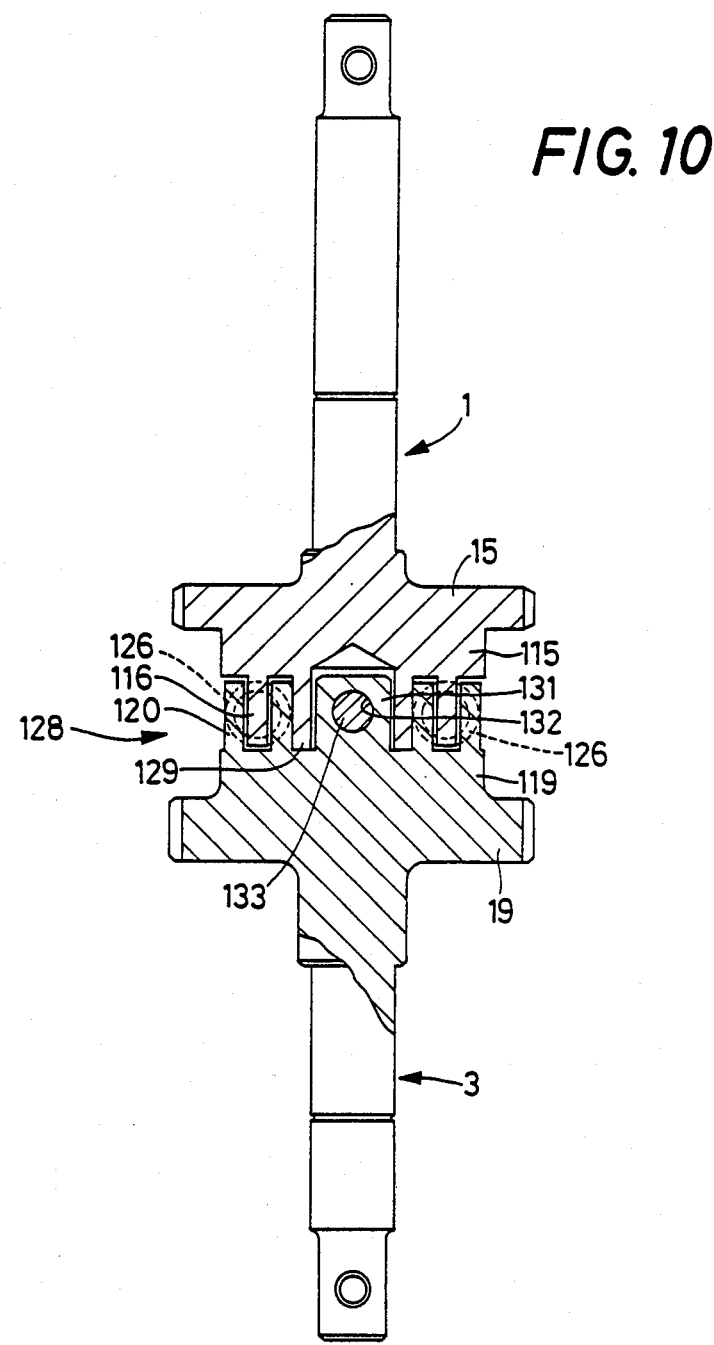

While the preceding and the present embodiments of FIGS. 6 and 10 use the two or four helical coil springs 126, it is possible that the elastic coupling 104 comprises only one helical spring. In these embodiments of FIGS. 6 and 10, the first and second ring-shaped portions 116, 120 are formed on the first and second steering shafts 1, 3, respectively. However, these first and second ring-shaped portions 116, 120 may be formed on the second and first steering shafts 3, 1, respectively.

As previously indicated, the elastic couplings 104, 128 provided in the above two embodiments of FIGS. 6 and 10 are used in combination with the detector of FIG. 1 or FIG. 3 which detects an axial displacement of the cylindrical cam 24 or of the first detector shaft 16 by means of the potentiometer 28 or sensor 34 or 42, as described in detail in connection with the first and second embodiments. However, it is possible that a relative angular displacement of the first and second steering shafts 1, 3 is detected by directly sensing an angular displacement of the first and second ring-shaped portions 116, 120, by means of a suitable sensing device.

It will be understood that other changes, modifications and improvements may be made in the invention, within the scope of the invention defined in the appended claims.

What is claimed is:

1. A torque detecting apparatus for an electrical power steering system, having a steering wheel, a first steering shaft connected to the steering wheel, a second steering shaft connected to a vehicle wheel to be steered, an electrically operated motor connected to the second steering shaft, and a controller for operating the motor to produce a driving force corresponding to a steering torque detected by the torque detecting apparatus, said torque detecting apparatus comprising:

an elastic coupling having an elastic member, and coupling said first and second steering shafts while permitting relative rotation of the first and second steering shafts through elastic deformation of said elastic member;

a first detector shaft and a second detector shaft which are disposed coaxially with each other and supported rotatably relative to each other, such that one of said first and second detector shafts is axially movable;

a first speed-up device for increasing an angular velocity of a rotary movement of said first steering shaft and transmitting the rotary movement to said first detector shaft;

a second speed-up device for increasing an angular velocity of a rotary movement of said second steering shaft and transmitting the rotary movement to said second detector shaft; and a rotation detector including a mechanical converter for converting relative rotation of said first and second detector shafts into an axial movement of said one of the first and second detector shafts, and an axial detector for detecting said axial movement of said one detector shaft to detect an angle of said relative rotation of the first and second detector shafts and thereby detect said steering torque, said detector producing an electric signal representative of said steering torque, said electric signal being applied to said controller.

2. A torque detecting apparatus according to claim 1, wherein said first speed-up device comprises a first gear fixed to said first steering shaft, and a first pinion fixed to said first detector shaft and engaging said first gear, while said second speed-up device comprises a second gear fixed to said second steering shaft, and a second pinion fixed to said second detector shaft and engaging said second gear.

3. A torque detecting apparatus for an electrical power steering system, having a steering wheel, a first steering shaft connected to the steering wheel, a second steering shaft connected to a vehicle wheel to be steered, an electrically operated motor connected to the second steering shaft, and a controller for operating the motor to produce a driving force corresponding to a steering torque detecting apparatus comprising:

an elastic coupling having an elastic member, and coupling said first and second steering shafts while permitting relative rotation of the first an second steering shafts through elastic deformation of said elastic member;

a first detector shaft and a second detector shaft which are disposed coaxially with each other and supported rotatably relative to each other;

a first speed-up device for increasing an angular velocity of a rotary movement of said first steering shaft and transmitting the rotary movement to said first detector shaft;

a second speed-up device for increasing an angular velocity of a rotary movement of said second steering shaft and transmitting the rotary movement to said second detector shaft; and a rotation detector including (a) an axially movable member which is axially movable in axial directions of said first and second detector shafts, (b) a mechanical converter for converting relative rotation of said first and second detector shafts into an axial movement of said axially movable member, said mechanical converter comprising a cam and a cam follower, said cam having a spiral cam groove formed about an axis aligned with axes of said first and second detector shafts, said cam follower being rotatable and axially movable relative to said cam having a protrusion fitting in said spiral cam groove, and (c) an axial detector for detecting said axial movement of said axially movable member to detect an angle of said relative rotation of the first and second detector shafts and thereby detect said steering torque, said detector producing an electric signal representative of said steering torque, said electric signal being applied to said controller.

4. A torque detecting apparatus according to claim 3, wherein said axially movable member is axially movable but not rotatable relative to one of said first and second detector shafts.

5. A torque detecting apparatus according to claim 3, wherein said first speed-up device comprises a first gear fixed to said first steering shaft, and a first pinion fixed to said first detector shaft and engaging said first gear, while said second speed-up device comprises a second gear fixed to said second steering shaft, and a second pinion fixed to said second detector shaft and engaging said second gear.

6. A torque detecting apparatus for an electrical power steering system, having a steering wheel, a first steering shaft connected to the steering wheel, a second steering shaft connected to a vehicle wheel to be steered, an electrically operated motor connected to the second steering shaft, and a controller for operating the motor to produce a driving force corresponding to a steering torque detected by the torque detecting apparatus, said torque detecting apparatus comprising:

an elastic coupling having an elastic member, and coupling said first and second steering shafts while permitting relative rotation of the first and second steering shafts through elastic deformation of said elastic member;

a first detector shaft and a second detector shaft which are disposed coaxially with each other and supported rotatably relative to each other;

a first speed-up device for increasing an angular velocity of a rotary movement of said first steering shaft and transmitting the rotary mvoement to said first detector shaft;

a second speed-up device for increasing an angular velocity of a rotary movement of said second steering shaft and transmitting the rotary movement to said second detector shaft; and a rotation detector including (a) an axially movable member which is axially movable in axial directions of said first and second detector shafts, (b) a mechanical converter for converting relative rotation of said first and second detector shafts into an axial movement of said axially movable member, said mechanical converter comprising an externally threaded member and an internally threaded member which are coaxial with said first and second detector shafts and which engage each other, and (c) an axial detector for detecting said axial movement of said axially movable member to detect an angle of said relative rotation of the first and second detector shafts and thereby detect said steering torque, said detector producing an electric signal representative of said steering torque, said electric signal being applied to said controller.

7. A torque detecting apparatus according to claim 6, wherein said first speed-up device comprises a first gear fixed to said first steering shaft, and a first pinion fixed to said first detector shaft and engaging said first gear, while said second speed-up device comprises a second gear fixed to said second steering shaft, and a second pinion fixed to said second detector shaft and engaging said second gear.

8. A torque detecting apparatus for an electrical power steering system, having a steering wheel, a first steering shaft connected to the steering wheel, a second steering shaft connected to a vehicle wheel to be steered, an electrically operated motor connected to the second steering shaft, and controller for operating the motor to produce a driving force corresponding to a steering torque detected by the torque detecting apparatus, said torque detecting apparatus comprising:

an elastic coupling including (a) a first ring-shaped member provided on one of said first and second steering shafts, coaxially with the steering shafts, and having at least one first radial groove which extends in a radial direction thereof so as to define at least one pair of first bearing surfaces, said first bearing surface facing each other in spaced-apart relation in a circumferential direction of the first steering shaft, (b) a second ring-shaped member provided on the other of said first and second steering shafts, and having an annular groove in which said first ring-shaped member fits, said second ring-shaped member having at least one second radial groove which extends in a radial direction thereof so as to define at least one pair of second bearing surfaces which face each other in spaced-apart relation in a circumferential direction of the second steering shaft such that said second bearing surfaces have a circumferential spacing equal to that of said first bearing surfaces, said first and second ring-shaped members being movable relative to each other in the opposite circumferential directions of the steering shafts, from a reference circumferential position at which the first and second radial grooves are aligned with each other, when said first and second steering shafts are rotated relative to each other, and (c) a coil spring disposed circumferentially of said first and second steering shafts, between each of said at least one pair of first bearing surfaces, and between each of said at least one pair of second bearing surfaces, said coil spring being compressed when said first and second supporting portions are rotated relative to each other in one of said opposite circumferential directions;

a first detector shaft and a second detector shaft which are disposed coaxially with each other and supported rotatably relative to each other;

a first speed-up device for increasing an angular velocity of a rotary movement of said first steering shaft and transmitting the rotary movement to said first detector shaft;

a second speed-up device for increasing an angular velocity of a rotary movement of said second steering shaft and transmitting the rotary movement to said second detector shaft; and a rotation detector associated with said first and second detector shafts to detect an angle of relative rotation of the first and second detector shafts and thereby detect said steering torque, said detector producing an electric signal representative of said steering torque, said electrical signal being applied to said controller.

9. A torque detecting apparatus for an electrical power steering system, having a steering wheel, a first steering shaft connected to the steering wheel, a second steering shaft connected to a vehicle wheel to be steered, an electrically operated motor connected to the second steering shaft, and a controller for operating the motor to produce a driving force corresponding to a steering torque detected by the torque detecting apparatus, said torque detecting apparatus comprising:

an elastic coupling including (a) a first supporting portion provided on said first steering shaft and having at least one pair of first bearing surfaces which are located away from an axis of the first steering shaft in a radial direction thereof, said first bearing surfaces facing each other in spaced-apart relation in a circumferential direction of the first steering shaft, (b) a second supporting portion provided on said second steering shaft and having at least one pair of second bearing surfaces which are located away from an axis of the second steering shaft in a radial direction thereof, said second bearing surfaces facing each other in spaced-apart relation in a circumferential direction of the second steering shaft such that said second bearing surfaces have a circumferential spacing equal to that of said first bearing surfaces, said first and second supporting portions being movable relative to each other in the opposite circumferential directions of the steering shafts, from a reference circumferential position at which the first and second supporting portions are aligned with each other, when said first and second steering shafts are rotated relative to each other, and (c) a coil spring disposed circumferentially of said first and second steering shafts, between each of said at least one pair of first bearing surfaces, and between each of said at least one pair of second bearing surfaces, said coil spring being pre-compressed even when said supporting portions are located at said reference circumferential position, said coil spring being further compressed when said first and second supporting portions are rotated relative to each other in one of said opposite circumferential directions;

a first detector shaft and a second detector shaft which are disposed coaxially with each other and supported rotatably relative to each other;

a first speed-up device for increasing an angular velocity of a rotary movement of said first steering shaft and transmitting the rotary movement to said first detector shaft;

a second speed-up device for increasing an angular velocity of a rotary movement of said second steering shaft and transmitting the rotary movement to said second detector shaft; and a rotation detector associated with said first and second detector shafts to detect an angle of relative rotation of the first and second detector shafts and thereby detect said steering torque, said detector producing an electric signal representative of said steering torque, said electric signal being applied to said controller.

10. A torque detecting apparatus for an electrical power steering system, having a steering wheel, a first steering shaft connected to the steering wheel, a second steering shaft connected to a vehicle wheel to be steered, an electrically operated motor connected to the second steering shaft, and a controller for operating the motor to produce a driving force corresponding to a steering torque detected by the torque detecting apparatus, said torque detecting apparatus comprising:

a first supporting portion provided on said first steering shaft and having at least one pair of first bearing surfaces which are located away from an axis of the first steering shaft in a radial direction thereof, said first bearing surfaces facing each other in spaced-apart relation in a circumferential direction of the first steering shaft;

a second supporting portion provided on said second steering shaft and having at least one pair of second bearing surfaces which are located away from an axis of the second steering shaft in a radial direction thereof, said second bearing surfaces facing each other in spaced-apart relation in a circumferential direction of the second steering shaft such that said second bearing surfaces have a circumferential spacing equal to that of said first bearing surfaces;

said first and second supporting portions being movable relative to each other in the opposite circumferential directions of the first and second steering shafts, from a reference circumferential position at which the first and second supporting portions are aligned with each other, when said first and second steering shafts are rotated relative to each other;

a coil spring disposed circumferentially of said first and second steering shafts, between each of said at least one pair of first bearing surfaces, and between each of said at least one pair of second bearing surfaces, said coil spring being pre-compressed even when said supporting portions are located at said reference circumferential position, said coil spring being further compressed when said first and second supporting portions are rotated relative to each other in one of said opposite circumferential directions; and a rotation detector associated with said first and second steering shafts to detect an angle of relative rotation of the first and second detector shafts and thereby detect said steering torque, said detector producing an electric signal representative of said steering torque, said electric signal being applied to said controller.

11. A torque detecting apparatus according to claim 10, wherein opposite ends of said coil spring bear on said first and second bearing surfaces via retainer means.

12. A torque detecting apparatus according to claim 10, wherein said first and second steering shafts are disposed coaxially with each other, said elastic coupling comprising circumferential stop means for limiting a maximum angle of relative rotation of said first and second steering shafts.

13. A torque detecting apparatus according to claim 12 wherein one of said first and second steering shafts has a tubular portion coaxial with the steering shafts, and the other of the steering shafts has a shaft portion fitting in said tubular portion, said tubular portion and said shaft portion being connected by a pin which is inserted through a first and a second through-hole formed through corresponding parts of said tubular and shaft portions, respectively, in their diametric direction, one of said first and second through-holes having a diameter larger than that of said pin, said stop means comprising said tubular portion, said shaft portion and said pin.

14. A torque detecting apparatus according to claim 10, wherein one of said first and second supporting portions consists of a first ring-shaped member disposed coaxially with said steering shafts, and the other of said first and second supporting portions consists of a second ring-shaped member having an annular groove in which said first ring-shaped member fits such that said first and second ring-shaped members are rotatable relative to each other, said first and second ring-shaped members having at least one radial groove which extends in a radial direction thereof and which defines said at least one pair of first bearing surfaces and said at least one pair of second bearing surfaces.

15. A torque detecting apparatus for an electrical power steering system, having a steering wheel, a first steering shaft connected to the steering wheel, a second steering shaft connected to a vehicle wheel to be steered, an electrically operated motor connected to the second steering shaft, and a controller for operating the motor to produce a driving force corresponding to a steering torque detected by the torque detecting apparatus, said torque detecting apparatus comprising:

an elastic coupling including (a) a first ring-shaped member provided on one of said first and second steering shafts, coaxially with the steering shafts, and having at least one first radial groove which extends in a radial direction thereof so as to define at least one pair of first bearing surfaces, said first bearing surfaces facing each other in spaced-apart relation in a circumferential direction of the first steering shaft, (b) a second ring-shaped member provided on the other of said first and second steering shafts, and having an annular groove in which said first ring-shaped member fits, said second ring-shaped member having at least one second radial groove which extends in a radial direction thereof so as to define at least one pair of second bearing surfaces which face each other in spaced-apart relation in a circumferential direction of the second steering shaft such that said second bearing surfaces have a circumferential spacing equal to that of said first bearing surfaces, said first and second ring-shaped members being movable relative to each other in the opposite circumferential directions of the steering shafts, from a reference circumferential position at which the first and second radial grooves are aligned with each other, when said first and second steering shafts are rotated relative to each other, and (c) a coil spring disposed circumferentially of said first and second steering shafts, between each of said at least one pair of first bearing surfaces, and between each of said at least one pair of second bearing surfaces, said coil spring being compressed when said first and second supporting portions are rotated relative to each other in one of said opposite circumferential directions; and a rotation detector associated with said first and second steering shafts to detect an angle of relative rotation of the first and second detector shafts and thereby detect said steering torque, said detector producing an electric signal representative of said steering torque, said electric signal being applied to said controller.

* * * * *

UNITED STATES PATENT AND TRADEMARK OFFICE
CERTIFICATE OF CORRECTION

PATENT NO. : 4,676,331

DATED : June 30, 1987

INVENTOR(S) : IWAKI ET AL.

It is certified that error appears in the above-identified patent and that said Letters Patent is hereby corrected as shown below:

Column 7, line 48, after the numeral "12" (second occurrence) and before "produces", there should be no comma.

Column 9, line 27, "small-diamter" should read --small-diameter--.

Column 9, line 34, "diameterically" should read --diametrically--.

Column 9, line 32, "thl" should read --the--.

Column 11, line 32, "circmferential" should read --circumferential--.

Column 12, line 63, between "torque" and "detecting" --detected by the torque detecting apparatus, said torque-- should be inserted.

Column 12, line 66, after "first", "an" should read --and--.

Column 13, line 23, before first word "having" --and-- should be inserted.

Column 14, line 31, after "and" and before "controller" --a-- should be inserted.

UNITED STATES PATENT AND TRADEMARK OFFICE
CERTIFICATE OF CORRECTION

PATENT NO. : 4,676,331

DATED : June 30, 1987

INVENTOR(S) : IWAKI ET AL.

It is certified that error appears in the above-identified patent and that said Letters Patent is hereby corrected as shown below:

Column 14, line 41, after "bearing", "surface" should read --surfaces--.

Column 17, line 5, after "12", a comma should be inserted --,--.

Signed and Sealed this

Eighth Day of December, 1987

Attest:

DONALD J. QUIGG

Attesting Officer

Commissioner of Patents and Trademarks